United States Patent [19]
Eggemeier

[11] 3,881,604
[45] May 6, 1975

[54] MACHINE LOADER PICKUP DEVICE
[75] Inventor: William Louis Eggemeier, Florence, Ky.
[73] Assignee: Cincinnati Milacron Inc., Cincinnati, Ohio
[22] Filed: May 11, 1973
[21] Appl. No.: 359,621

[52] U.S. Cl. ............ 214/1 BC; 279/75; 294/102 R
[51] Int. Cl. ............................................. B66c 1/48
[58] Field of Search..... 214/1 BB, 1 BC, 1 BD, 309, 214/147 T, 1 B; 294/83 AA, 102 R, 90, 87.2; 279/1 B, 75

[56] References Cited
UNITED STATES PATENTS
3,428,190  2/1969  Joichi.............................. 214/1 BB
FOREIGN PATENTS OR APPLICATIONS
739,916  11/1955  United Kingdom................ 294/87.2
747,138  3/1956  United Kingdom................ 214/309
1,330,821  5/1963  France................................. 294/90

Primary Examiner—Robert J. Spar
Assistant Examiner—George F. Abraham

[57] ABSTRACT

A machine loader pickup device wherein a pivot arm is utilized to move it through an arcuate path in a vertical plane from a preset part pickup position to a work zone, and a linear actuator is mounted to the outer-most point of the pivot arm in a horizontal plane. The linear actuator is provided with ring means to convert its axial displacement into radial displacement of clamping balls, and the radial displacement of the clamping balls is sufficient to permit entry of eccentrically located parts or parts of varying diameters, which may thereafter be easily exited.

1 Claim, 4 Drawing Figures

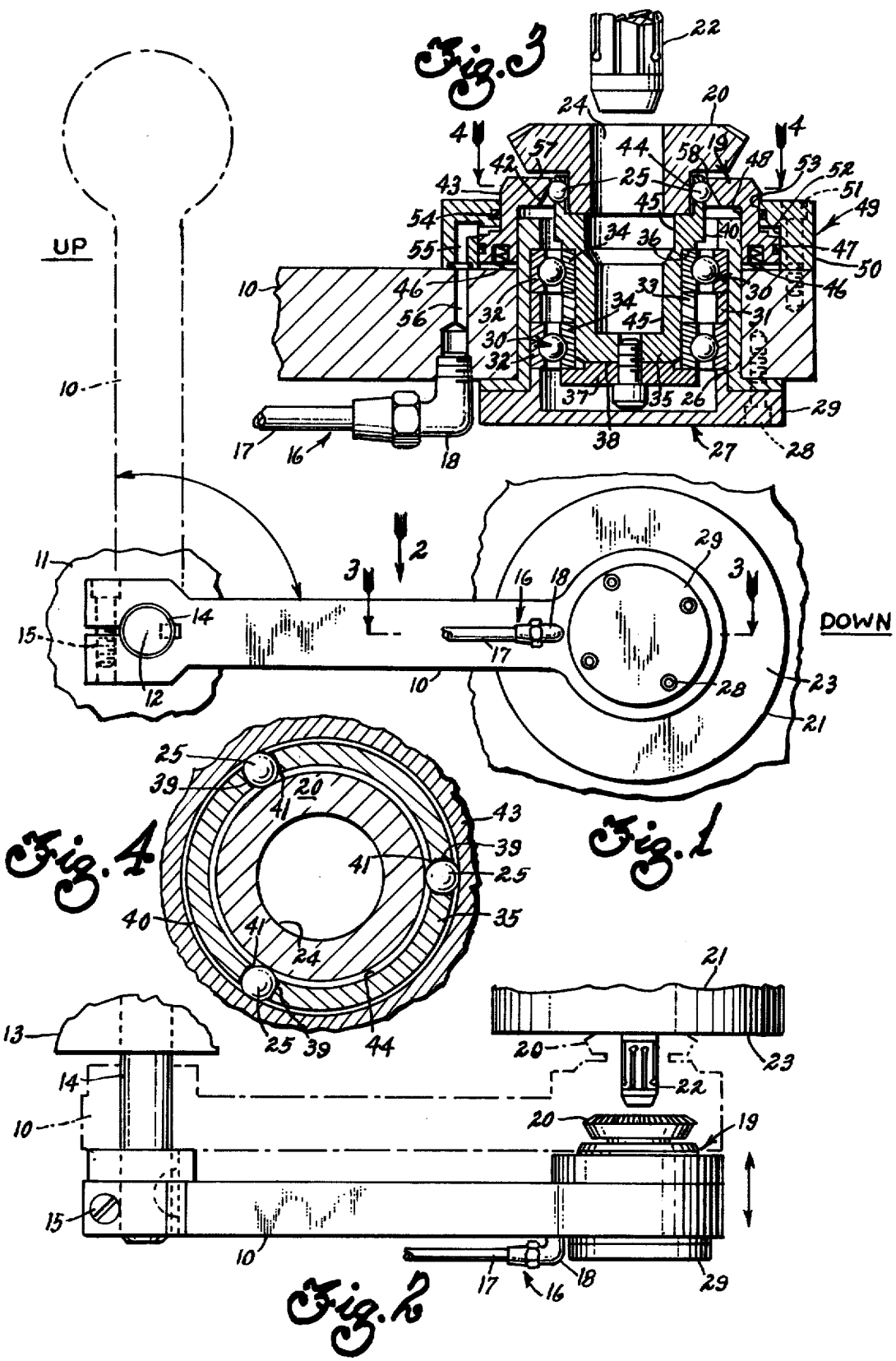

MACHINE LOADER PICKUP DEVICE

BACKGROUND OF THE INVENTION

This invention relates to automatic loading of workpieces processed on a grinding machine. In general, parts are picked up at a preset part pickup position; thereafter, the parts are moved through an arcuate path to a workholding device such as an arbor chuck which is well-known in the art. Workpieces loaded by this type of device are generally short, stubby, shaft-like parts, many having a hole through the central axis.

In the description of the preferred embodiment, it will be shown that a bevel gear, well-known in the automotive art as a "side gear" of automobile differentials, is used for a sample workpiece. It is very important to have an allowable radial clearance within the pickup device to permit the entry of a workpiece in the loading zone which may be eccentric to the central axis of the loading device and not permit itself to be picked up by jaw-type devices known in the prior art.

Prior art devices used on the pivot arm of these type loaders have comprised jaw-type chucks having radially displaceable jaws with flat clamping faces within. The problems inherent with these prior art jaw-like clamping devices are that they do not have enough radial movement to permit entry of parts of varying diameter, or parts that are eccentric to the theoretical pickup center. Further, the jaws themselves tend to fly away while the arm is traversing the arcuate path for the reason that this traverse time is of very short duration, in the magnitude of several seconds. Thus, it can be seen that at a moderately long pivot arm length the centrifugal forces will tend to open up the jaws during the traverse time. A further problem encountered with the jaw-like clamping devices of the prior art is the problem of actuating the jaws through radially displaceable pistons. Here, the mechanism to perform the displacement has been very bulky and heavy thus adding to the dynamic forces which generate considerable stress in the pivot arm.

To do away with the need of the radial actuation of the jaw-like members, a novel prior art device was developed which included axially extendable fingers looking like cantilevered beams, made of springy material which deflected upon being pushed over the hub of the ring-like parts. However, it can be seen that the clamping force cannot be controlled since it is variable directly with the diametral changes in the part, since this is the very inherent nature of beam springs. Further, the heavy beam springs extending forth to capture the part at the load zone are central about an axis through the pivot arm and they do not move sufficiently or with independence to permit the entry of eccentric or varying diameter parts.

SUMMARY OF THE INVENTION

The invention contained in the present application is comprised of a pivot arm for the loading of workpieces on a grinding machine wherein the outermost point of the pivot arm is fitted with an axially oriented linear actuator which converts its displacement into the radial displacement of a plurality of balls, said balls being used to clamp the hub of a short stub-like part. Further, the balls are captivated in a rotatably mounted spindle to facilitate the loading of the workpiece onto an expanding arbor chuck which may still be rotating at the time of part transfer from the pivot arm to the arbor chuck.

The clamping force of the balls on the workpiece may be controlled by the fluid pressure to the linear actuator, whereas this control is not possible with chucks which have spring fingers giving a fixed load per unit of deflection, nor by conventional jaw-type chucks which have their force applied directly to the jaws along a radial pathway since said jaw chucks are affected by centrifugal forces.

It is an object therefore, of the present invention to facilitate the loading of workpieces on a grinding machine.

It is also an object of the present invention to provide clamping means through which the clamping force can be varied to provide greater control of the workpiece and to prevent the marring of a finished workpiece diameter when required.

It is a further object of the present invention to provide clamping means which is rotatably mounted in a spindle whereby the part which is spun by an already turning chuck may be rotated with ease to prevent damage to the clamping means.

Still another object of the present invention is to provide clamping means for parts of rotation whereby a mechanical advantage may be gained from the applied force to the force directed upon the workpiece.

A still further object of the present invention is to provide chuck means which may be opened sufficiently to provide entrance of a workpieces which vary in diameter or are eccentric to the theoretical pickup center.

Other objects and advantages of the present invention should be readily apparent by reference to the following specifications, considered in conjunction with the accompanying drawings forming a part thereof and it is to be understood that any modification may be made in the exact structural details thereshown and described within the scope of the dependent claims without departing from or exceeding the spirit of the invention.

DESCRIPTION OF THE DRAWINGS

FIG. 1 is an elevation view on a grinding machine showing a loader pickup arm in the "down" position for deposition of a workpiece on a workholding chuck. A second phantom position is shown to illustrate the part pickup position.

FIG. 2 is a plan view of a grinding machine loader arm showing the arm in the "down" position ready for deposition of a workpiece on a workholding chuck and a second phantom position is shown wherein the arm is translated toward the workholding chuck where the part is released. This view is taken in the direction of the arrow on FIG. 1.

FIG. 3 is an enlarged section taken along the line 3—3 of FIG. 1 and showing the internal parts of a workholding chuck.

FIG. 4 is a sectional view taken along the lines 4—4 of FIG. 3 and showing workholding balls in their respective retainers and also showing the actuating ring and workpiece to be held by said balls.

DESCRIPTION OF THE PREFERRED EMBODIMENT

Referring now to the drawings, and particularly to FIG. 1 thereof, there is shown on a grinding machine, a loading arm 10 of an automatic part loader 11 wherein the arm 10 is driven through its pivot point 12 by a rotary actuating means 13, the shaft 14 of said means 13 being keyed to the pivot arm 10 of the loader 11 and the pivot arm 10 is clamped in position by a locking screw 15. Also shown in FIG. 1 is a fluid conduit 16 comprised generally of tubing 17 affixed in a tubing connector 18 to provide actuating fluid to the linear actuator 19 shown in FIG. 3. FIG. 1 further shows the pivot arm 10 of the loader in two positions, those positions being the down position for loading the workpiece 20 onto the workholding chuck 21 and the up position for pickup of the workpiece 20. On the plan view, FIG. 2, it may be seen that the loader pickup arm 10 is in the down position and when in the down position the arm translates by linearly actuating the rotary actuating means shaft 14 toward the workholding chuck by a piston, well-known in the art. At the point in time when the workpiece 20 is located on the chuck arbor 22, seated against the chuck face 23, the arbor 22 of the chuck 21 is expanded to grasp within the bore 24 of the workpiece 20 and the linear actuator 19, shown in FIG. 3, is relieved of its holding pressure, thereby permitting the linear actuator 19 to move toward the workpiece and release the clamping pressure which is exerted on the balls 25 of FIG. 3. After releasing the holding pressure on the balls 25, the loader pickup arm 10 is retracted horizontally away from the workpiece 20 and is lifted to the up position, shown on FIG. 1, to capture a new workpiece 20. Here it should be noted that the loader 11 serves only one function, that is, to load a workpiece 20 from the load position down and onto the work holding chuck 21. It does not unload the workpiece 20 from the chuck 21, since unloading is performed by stripper means to eject the part rapidly off the chuck holding arbor 22, said stripper means being integral to the chuck and is well-known in the art.

Referring now to FIG. 3, the work holding mechanism is shown in great detail through an enlarged view. The loader pickup arm 10 is provided with a bore 26 through which a cartridge-type of bearing package 27 is inserted and retained by means of screws 28 through a clamping flange 29. Within this cartridge is located a pair of antifriction ball bearings 30 held apart to the proper preload by a first spacer 31 touching the outer races 32 and a second spacer 33 engaging the inner races 34 of said ball bearings 30. A spindle 35 is located within the bores of the ball bearings 30 and is held in the proper axial position by means of a shoulder 36 seating against one ball bearing inner race 34 and a retaining ring 37 clamped to the inner end 38 of the spindle 35, and seating against the inner race 34 of the other ball bearing 30. Thus, it may be seen that the spindle 35 is free to rotate whenever a torque is imparted to the clamping ball 25 set.

Referring to FIG. 4, an enlarged view shows that the clamping balls 25 are equally spaced about the outermost end of the spindle 35 and are seated in holes 39 which are drilled radially from the outer diameter 40 of the spindle 35 to a preset depth, leaving a tapered bottom 41 to the captivating hole 39. Thus, when the ball 25 is in the hole 39 it is trapped from falling inwardly when no workpiece 20 is in position, and further, it is prevented from leaving its hole 39 in an outward direction by virtue of the ramp of the conical bore 42 in the piston 43. A clearance bore 44 is provided within the outer end of the spindle 35 to permit the entry of the workpiece 20 when the balls 25 have been released for such entry. Similarly, other relief diameters 45 are provided to allow clearance around any other inwardly extending diameters of the workpiece 20.

The clamping force to be exerted on the workpiece 20 is provided through movement of a piston 43, wherein the piston 43 has a short travel and it is pressure-actuated by a fluid to clamp the balls 25 on the workpiece 20. Thereafter, the pressure is relieved and the piston 43 is deactivated by springs 46 to relieve the ball 25 clamping force. The piston 43 is provided with sealing rings 47 to maintain the fluid pressure and prevent leakage of said fluid, and an inner bore 48 is provided within the piston 43 so that the piston may pilot upon the bearing catridge pack with a sufficient depth of the bore allowing for travel of the piston 43 without axially bottoming before clamping the workpiece 20.

A cylinder housing 49 is provided for the piston 43 through utilization of a cap 50 held in place on the pivot arm 10 by screws 51. Within the cap 50 is provided a first cylinder bore 52 so that pressure may be contained when activating the piston 43. A second, coaxial, diameter 53 is provided so that the housing 49 may be centered on the piston 43 for piloting means. Within the second diameter 53 of the housing 49 is provided a sealing ring 54 to prevent leakage of fluid to the outside. Interdrilling 55 is provided within the cylinder housing 49 so that fluid may be brought from a fluid connector 18 to the pivot arm 10; through a port 56 provided in the pivot arm 10; and then into the cylinder housing 49 where the fluid is directed to the proper end of the piston 43 for actuation.

The pressure port 56 thus permits fluid under pressure to come forth and activate the piston 43 for clamping, and when clamping is no longer desired, the pressure is relieved and the fluid is exited through the same port 56 by the back pressure exerted due to the reacting springs 46.

The piston 43 is provided with a front flange 57 extending from its pilot diameter radially to a clearance bore 58 around the spindle outer diameter 40. Within this flange 57 of the piston 43 there is provided a conical bore 42, or chamfer, the faces of which conical bore 42 contact the clamping balls 25, and thus it may be seen that when an activating force is applied to move the piston 43 axially the effective decrease in diameter contacting the balls 25 will exert a radial force inward toward the workpiece 20. Therefore, by this indirect means of applying force to clamp the diameter of the workpiece 20 it is possible, through varying the angle of the conical bore 42, to obtain a mechanical advantage of axial force to clamping force. Also, an irreversible mechanism is obtained through friction whereby no centrifugal forces seen by the balls 25 can move the piston 43 axially. Further, since the force is initiated by fluid means, it is possible through regulation of the fluid pressure to obtain a very exact control over the clamping force which becomes of particular importance when a clamped diameter is one which has been previously finished and it is desirable not to mar the finished diameter.

In normal operation the loading arm 10 moves to the up position, or pickup zone with the piston 43 de-energized; that is, moved away by spring force from a clamped position on the balls 25. At this position, the balls 25 have a certain permissable radial play to accommodate a wide tolerance of error on an incoming workpiece 20. In the up position the arm 10 is translated inwardly as is similarly shown in FIG. 2, to permit the balls 25 to actually place themselves on the diameter to be clamped. Here, the radial play of the balls 25 will permit entrance of an eccentrically located or skewed workpiece 20.

After positioning the balls 25 on the diameter to be clamped pressurized fluid is introduced through the pressure port 56 in the pivot arm 10 and into the cylinder housing 49 to clamp the balls 25 by the indirect means of the conical bore 42. Thereafter, maintaining the pressure within the cylinder housing 49, the pivot arm 10 is axially positioned to its outermost point, away from the arbor chuck 21, as shown in FIG. 2, and the pivot arm 10 is then moved through an arcuate path from the up position to the down position where the workpiece 20 is coaxially in line with the work holding chuck 21, as shown on FIG. 1. At this down point the pivot arm 10 is translated inwardly toward the work holding chuck 21 and the part is thereby placed upon the arbor 22 of the chuck 21.

Since the previously ground workpiece has already been ejected from the chuck 21 by push rod stripper means, well-known in the art, the chuck 21 may be still rotating in its coast-down mode prior to stop. When the workpiece 20 contacts the chuck 21, the torque transmitted to the workpiece 20 is seen by the spindle 35, which is rotatably mounted in the bearings 30 and thus no parts of the loading mechanism can be damaged by rotational torque.

After the workpiece 20 is translated inwardly to the proper axial position the chuck arbor 22 is expanded to captivate the bore 24 of the workpiece 20 and the fluid within the cylinder housing 49 of the loading mechanism is depressurized and forced to exit by the reacting springs 46. When the piston 43 is forced to unclamp by the springs 46, the balls 25, therefore, lose their clamping power on the workpiece 20 and at this point, the loading arm 10 is translated to an outer position away from the workpiece 20, as shown in FIG. 2, and the pivot arm 10 is swung back up through its arcuate path to pickup the next part, and the prior-loaded workpiece is machined.

Thus, while particular embodiments of the invention have been illustrated and described, it will be apparent to those skilled in the art that various changes and modifications can be made to the mechanism without departing from the spirit and scope of the invention and it is intended to cover in the appended claims all such changes and modifications that are within the scope of this invention.

What is claimed is:

1. In a machine loader, a pick-up device comprising:
  a. an activator shaft;
  b. means for supporting said shaft for rotation and axial translation;
  c. an arm fixed to said shaft and extending radially therefrom;
  d. a housing fixed to said arm at the end thereof remote from said shaft and movable through a predetermined path when said shaft is rotated and axially translated;
  e. a plurality of balls spaced around one end of said housing and retained therein in a rotatably mounted spindle, said balls movable radially relative to a central axis through said housing parallel to said shaft;
  f. a piston and cylinder in said housing, movable relative to one another along the central axis; and
  g. a ring affixed to one of said piston and cylinder, whose axis is coaxial to said central axis, and wherein said ring has a conical bore, the surface of which bore acts as a wedge upon the balls to convert axial motion of said piston and cylinder into simultaneous radial motion of said balls to move said balls toward and away from said central axis.

* * * * *